(12) United States Patent
Spencer et al.

(10) Patent No.: US 6,930,434 B1
(45) Date of Patent: Aug. 16, 2005

(54) GENERATOR ROTOR POLE CROSSOVER

(75) Inventors: Craig Michael Spencer, Oviedo, FL (US); Randy E Whitener, Chuluota, FL (US); Raul R Rico, Oviedo, FL (US); Larry Zeller, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/981,291

(22) Filed: Nov. 4, 2004

(51) Int. Cl.[7] ................................................ H02K 3/46
(52) U.S. Cl. ........................................ 310/270; 310/271
(58) Field of Search ................................ 310/270, 271, 310/260, 201, 208, 71

(56) References Cited

U.S. PATENT DOCUMENTS

| | | | |
|---|---|---|---|
| 720,307 A | * | 2/1903 | Wood .......................... 310/271 |
| 4,321,497 A | * | 3/1982 | Long .......................... 310/198 |
| 5,111,097 A | | 5/1992 | Londergan et al. ......... 310/270 |
| 6,333,579 B1 | | 12/2001 | Hirano et al. ............... 310/194 |

* cited by examiner

Primary Examiner—Dang Le

(57) ABSTRACT

The present invention increases the life of a pole crossover while minimizing the need for timely inspections and costly replacements. The present invention splits the pole crossover band 4 at one or more locations along its circumference and then joins the multiple arcs with a flexible member 10, such as an omega shaped bow. As deflection related stresses 8 increase, the circumference of the pole crossover band, the flexible member 10 allows for a natural expansion point in the otherwise rigid material. This relieves stresses that would otherwise be transferred to the connection point 6 between the pole crossover and the generator windings that can cause cracking and eventually generator failure.

19 Claims, 2 Drawing Sheets

GENERATOR ROTOR POLE CROSSOVER

FIELD OF THE INVENTION

The field of the invention relates to generator rotors, and specifically to current pole crossovers.

BACKGROUND

The pole windings of a generator rotor need to form a complete circuit and pole crossovers are used to this effect. Though pole crossovers can take the form of many different shapes and sizes, effectual pole crossovers for generator rotors are thick circular or semicircular bands of strong, highly conductive metal such as copper.

FIG. 1 illustrates one type of semi-circular pole crossover. Axial arms 2 connect to either pole of the generator rotor winding and are joined together by a semi-circular band 4. Though not shown, the band abuts rotor windings on its outer circumference. The axial arms 2 proceed inboard into slots in the rotor forging body. The portions of the rotor winding outside of the rotor forging body are referred to as the rotor end windings. The axial arms 2 and band are joined, in this example, at square corners 6, which are either contiguous or a brazed joints. During operation, the rotor is rotated at high speeds. The rotor winding is not rigid enough to provide for its own centripetal acceleration which maintains its radial location, therefore a heavy ring of steel, known as a retaining ring, is used to retain the end winding during operation while wedges contain the straight copper in the rotor forging body slots. During operation, the retaining ring deflects some amount in the radially outward direction. Due to the summation between the tangential momentum of the copper and the centripetal acceleration permitted by the retaining ring, the rotor end winding, including the pole crossover, conforms to this deflection of the ring. Since the axial arms 2 are rigidly supported in their slots in the rotor forging body, the radial deflection 8 effectively enlarges the diameter of the rotor end windings, including the pole crossover. This creates a difference of movement between the band 4 section of the pole crossover and the axial arms 2, causing deflection related stresses at the square corner 6.

These stresses on the square corner create metal fatigue which can progress into cracking and eventually failure of the crossover, which in turn will cause a loss of the generator electrical field. Many of these generators start up and shut down on daily cycles, providing for relatively rapid accumulation of metal fatigue damage and driving crack propagation. To replace a failing crossover is a time consuming process, which requires that the generator be off-line for extended periods and which risks damage to other parts of the generator such as the winding insulation.

What is needed is a method and apparatus that accommodates the deflection related stresses to which the pole crossover is subjected. Furthermore, a method and apparatus is needed that can accomplish this with minimal invasion to the generator system as well as having the ability to be readily retrofitted into existing machines.

SUMMARY OF THE INVENTION

With the foregoing in mind, methods and apparatuses consistent with the present invention, which inter alia, increase the life of a pole crossover while at the same time minimize the need for timely inspections and costly replacements. The present invention splits the pole crossover band at one or more locations along its circumference and then joins the multiple arcs with a flexible member, such as an omega shaped bow. As deflection related stresses increase the circumference of the pole crossover band, the flexible member allows for a natural expansion point in the otherwise rigid material. This relieves stresses that would otherwise be transferred to the connection point between the pole crossover and the generator windings and that would cause cracking and eventually generator failure.

The omega shaped bow embodiment of the flexible member is attached to the pole crossover band via a pair of struts. These struts raise the inner circumference of the band and allow the omega shaped bow to sit within the outer circumference of the band. The omega shaped bow must be at least partially made of conducting material, conductive enough not to inhibit the current flow.

The actual shape of the omega shaped bow introduces flexibility into the pole crossover band. This flexibility may be further increased by using a series of laminations, such as thin copper laminations, stacked together. Laminations are from 0.016"–0.125" (0.04–0.31 cm) thick and approximately 2–16 of such laminations are used per omega shaped bow.

These and other objects, features, and advantages in accordance with the present invention are provided particular embodiments by a pole crossover with a deflection stress reduction section comprising a circular or semi-circular band, two axial arms joined to the band by joints and one or more flexible members. The one or more flexible members intersect the band, dividing it into at least two arcs joined by the flexible member. The flexible member is capable of expanding to reduce deflection stresses when the circumference of the band increases.

In another embodiment, the present invention provides for a pole crossover with a deflection stress reducing section comprised of a band, two struts and an omega shaped bow with an integral loop. The omega shaped bow intersects the band, dividing the band into separate arcs. The omega shaped bow is joined to the band via the two struts. The two struts are raised on the inner circumference of the band such that the omega shaped bow is oriented in a way that the integral loop is oriented outwardly and the omega shaped bow is recessed in respect to the outer circumference of the band. Also, the omega shaped bow is comprised of a plurality of stacked thin sheet laminations. The omega shaped bow reduces deflection stresses created by the expansion of the band.

In still another embodiment the present invention provides for an apparatus that allows for an expansion area within a pole crossover band that comprises an omega shaped bow and two struts. The omega shaped bow divides the pole crossover band into separate arcs. The two struts are integral with the separate arcs such that they are raised on the inner circumference of the separate arcs. The omega shaped bow joins the separate arcs via the two struts and the omega shaped bow is oriented such that the integral loop of the omega shaped bow is oriented outwardly with respect to the pole crossover band and is also recessed with respect to the outer circumference of the pole crossover band. The omega shaped bow allows for expansion of the pole crossover band without the creation of excessive deflection related stresses. The omega shaped bow can also be made of a plurality of stacked thin sheet laminations.

BRIEF DESCRIPTION OF THE FIGURES

The invention is explained in more detail by way of example with reference to the following drawings.

DETAILED DESCRIPTION OF THE INVENTION

Figure 1:
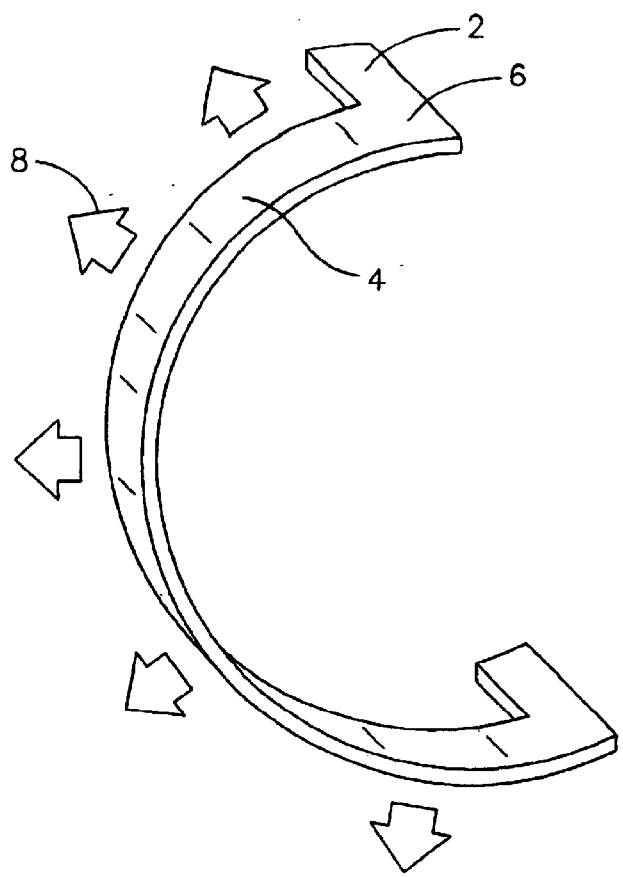
FIG. 1 illustrates a semi-circular pole crossover according to the prior art.

The present invention provides for a pole crossover with an inclusive area of expansion to relieve stress points on the crossover unit that would otherwise result from deflection during ordinary generator operation. Deflection of supporting elements causes the pole crossover to deflect in the outward radial direction and expand in the circumferential direction under the mechanical loading of rotational operation. However, this expansion puts strain where the circumferential band joins the axial arms that connect the band to the generator windings.

Since rotor generators are stopped and started daily, the expansion and contraction of the circumferential band puts repeated stress on the pole crossover joint, which is then subject to cracking and eventually electrical conductive failure. Therefore, it becomes necessary to inspect the pole crossover at regular intervals, and even to occasionally replace the pole crossover, which is very time consuming and risks damage to the rest of the generator rotor.

A natural expansion point is created, through the insertion of a flexible member into the circumferential band of the pole crossover. The flexible member physically separates the band into two separate arcs. As the circumference of the band increases, the flexible member allows the separate arcs to pull apart, thus relieving any stress that would otherwise be transferred to the joint, which in many embodiments takes the form of a square corner.

The number of flexible members inserted into the band of the pole crossover varies depending on the application. A common embodiment will have a single flexible member per half circle. Since some pole crossovers comprise only one half of a circle, only one flexible member will be present. The location of the flexible member on the band will also vary, but another common embodiment is the division of the band into approximately equal length arcs.

Since the electrical current carried through the pole crossover band has to pass entirely through the flexible member at one point, the flexible member is composed of conductive materials. The shape of the flexible member can vary, but in one embodiment is an omega shaped bow. The orientation of the omega shaped bow is such that the central bend projects outward so that deflection stresses will not distort its shape. In particular embodiments, the omega shaped bow is attached to struts that are inwardly raised from the bands inner circumference. This allows for the omega shaped bow to fit within the outer circumference of the pole crossover band.

As mentioned, the omega shaped bow needs to be electrically conductive and still flexible. These objectives are achieved in a particular embodiment by providing a flexible member that is made out of a stacking or lamination of thin conducing sheets. The number of thin sheets used can vary depending on the application and can be as few as two and as many as thirty or even more. In most applications where the thin sheets comprise copper sheets 0.016–0.125 inches (0.041–0.318 cm) in thickness, approximately 4–16 thin sheets will be used. Particular ranges include 9 coppers sheets 0.032 inches (0.08 cm) thick. Overall dimensions of such an omega shaped bow are 0.25–0.5 inches (0.6–1.3 cm) thick, 1.5–2.5 inches (3.8–6.3 cm) wide and 3.5–5.0 inches (8.8–12.5 cm) long.

Figure 2:
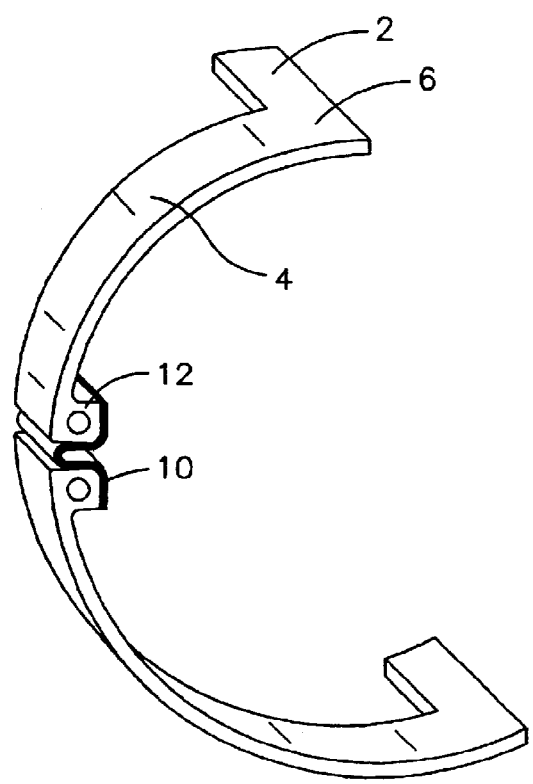
FIG. 2 illustrates a pole crossover with an omega shaped bow according to one embodiment of the present invention.

The generator rotor pole crossover can be built with the flexible member already included as a contiguous part. There are, however, many generators in current operation that require the installation of a flexible member of the present invention where replacing the entire pole crossover unit would be impracticable. In such circumstances an arc segment of the band can be removed, preferably splitting the remaining arc segments into approximately equal pieces. The new flexible member, and accompanying struts, when necessary, can then be substituted for the removed arc segment. These conductive materials can be joined together by a variety of techniques, such as brazing or mechanical connections such as bolts, clamps or crimps, known in the art Referring to FIG. 2, an embodiment of the present invention with an omega shaped bow 10 is illustrated. This figure illustrates a particular embodiment where a single omega shaped bow 10 divides a crossover band 4 into two approximately equal arcs. In other embodiments the omega shaped bow 10 can be placed other areas on the band 4 and additional omega shaped bows can be used, particularly in a full circle band. The omega shaped bow 10 is connected to the band 4 by a pair of struts 12. The struts effectively raise the inner circumference of the band so that the omega shaped bow does not extend past the band's outer circumference. The amount that the omega shaped bow 10 is recessed, in relation to the band's 4 outer circumference can be varied, but is typically quite small, such as a fraction of an inch/cm. In this embodiment the struts 12 have large central holes to conserve materials while still providing structural support.

Figure 3:
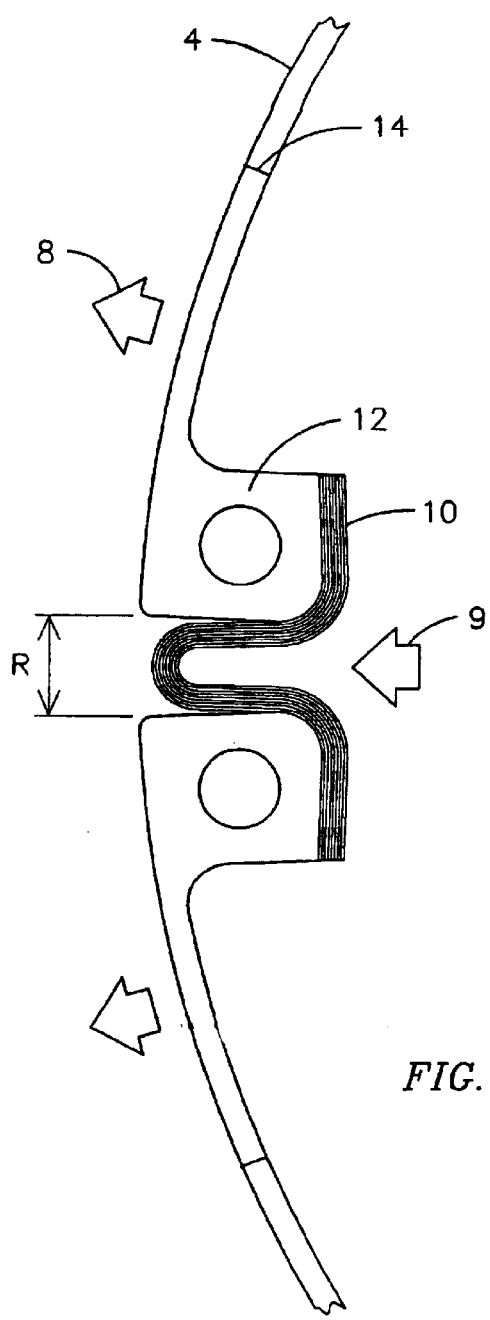
FIG. 3 illustrates a pole crossover with an omega shaped bow composed of thin laminations according to one embodiment of the present invention.

An omega shaped bow that is comprised of stacked thin sheet laminations is illustrated in FIG. 3. The thin sheets, such as copper, that comprise the omega shaped bow 10 provide additional flexibility while reducing susceptibility to metal fatigue. This type of omega shaped bow is unlikely to be integrally formed with the band 4 and as such need to be connected to the band, typically through brazing. In the embodiment shown, similar to the embodiment illustrated in FIG. 2, the omega shaped bow 10 is attached to the band 4 by struts 12. The brazing of the omega shaped bow to the struts should be done on the inner most raised surface to provide the greatest flexibility.

As the mechanical loading from rotational operation 8 acts on the band 4, the now separated arcs are allowed to pull apart a given distance R without creating stresses elsewhere in the pole crossover. The same mechanical loading that expands the band will also be acting on the omega shaped bow directly 9. The orientation of the omega shaped bow, 10 as illustrated, is such that the embodiment can withstand the mechanical loading that the operation of the rotor generator will produce. If the omega shaped bow where flipped so that the curve faced inwards, the centrifugal forces 9 would bend omega shaped bow and ruin the pole crossover. Through the proper positioning of the omega shaped bow on struts, the mechanical loading can be received by the omega shaped bow without causing any damage and without the omega shaped bow extending past the outer circumference of the pole crossover band.

In the embodiment shown in FIG. 3, the omega shaped bow 10 is not created as a contiguous member of the band 4. The struts 12, however, may be contiguous or added to the band. The addition of struts will create an interface 14 between the struts and the band that can be joined by techniques known in the art such as brazing. New generator rotors can be manufactured with the present invention in place, or existing ones can be retrofitted. Pole crossovers of the prior art can be located on the flexible arms, which means that retro fitting them onto existing generators can damage the nearby insulation. The present invention adds the pole crossover away from the fragile windings, so the retrofitting of the present invention is advantageous over the prior art.

Figure 4:
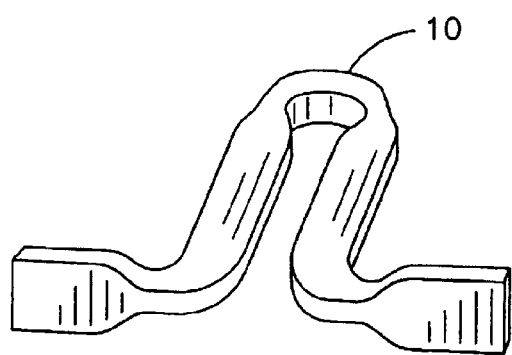
FIG. 4 illustrates one type of omega shaped bow composed of a solid piece of conductive material.

The omega shaped bow can have a variety of different shapes and compositions. The omega shaped bow shown in FIG. 3 is composed of thin laminated sheets, but its overall thickness and width is fairly constant. FIG. 4 shows one example of a different type of omega shaped bow 10 that is made out of a single piece of conductive material. The looped portion is narrower and thicker than the straight portions. Other embodiments of the omega shaped bow will be apparent to one of ordinary skill in the art.

In one embodiment the present invention provides for a pole crossover with a deflection stress reducing section comprising a circular or semi-circular band, two axial arms joined to the band by joints and one or more flexible members. The one or more flexible members intersect the band, dividing it into at least two arcs joined by the flexible member. The flexible member is capable of expanding to reduce deflection stresses when the circumference of the band increases.

In one embodiment, a single flexible member is used per semicircular half of the band. So, if the band is a complete circle, two flexible members are used, and if the band is a half circle then one flexible member is used. The flexible members divide the band into equal segments.

In a particular embodiment, the pole crossover is an omega shaped bow. The omega shaped bow may be distinct or a contiguous unit. When it is distinct, it may further be made of multiple stacked thin sheet laminations. The thin sheet laminations need to be made of conductive materials, such as copper. In a further particular embodiment, the omega shaped bow is joined to the band by struts that are raised on the inner circumference of the band. This configuration also provides for the omega shaped bow to be recessed in relation to the outer circumference of the band.

In another embodiment, the present invention provides for a pole crossover with a deflection stress reducing section comprised of a band, two struts and an omega shaped bow with an integral loop. The omega shaped bow intersects the band, dividing the band into separate arcs, and the omega shaped bow is joined to the band via the two struts. The two struts are raised on the inner circumference of the band such that the omega shaped bow is oriented in a way that the integral loop is oriented radially outward and the omega shaped bow is recessed in respect to the outer circumference of the band. Also the omega shaped bow is comprised of a plurality of stacked thin sheet laminations. The omega shaped bow reduces deflection stresses created by the expansion of the band.

In a particular embodiment, the stacked thin sheet laminations are comprised of 4–16 thin sheets. And in a more particular embodiment they are comprised of 8–12 thin sheets. In another embodiment, the thin sheets are approximately 0.016–0.125 inches (0.041–0.318 cm) in thickness and the omega shaped bow is approximately 0.25–0.5 inches (0.6–1.3 cm) thick, 1.5–2.5 inches (3.8–6.3 cm) wide and 3.5–5.0 inches (8.8–12.5 cm) long.

In still another embodiment, the omega shaped bow intersects the band at approximately the band's midway point. In a related embodiment, there are multiple omega shaped bows used per band. In a further particular embodiment, the omega shaped bow is recessed approximately 0.1–0.2 inches (0.25–0.5 cm).

In still another embodiment the present invention provides for an apparatus that allows for an expansion area within a pole crossover band that is comprised of an omega shaped bow and two struts. The omega shaped bow divides the pole crossover band into separate arcs. The two struts are integrated onto the separate arcs such that they are raised on the inner circumference of the separate arcs. The omega shaped bow joins the separate arcs via the two struts. The omega shaped bow is oriented such that the integral loop of the omega shaped bow is oriented outwardly with respect to the pole crossover band and is also recessed with respect to the outer circumference of the pole crossover band. The omega shaped bow allows for expansion of the pole crossover band without the creation of excessive deflection related stresses. The omega shaped bow is also made of a plurality of stacked thin sheet laminations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions, which are to be given the full breadth of the claims appended and any and all equivalents thereof.

What is claimed is:

1. A pole crossover with a deflection stress reducing section comprising:
   a band, wherein said band is at least one of circular and semi-circular;
   two axial arms;
   two joints, wherein said two joints connect said two axial arms with said band; and
   at least one flexible member;
   wherein said at least one flexible member intersects said band wherein said band is divided into at least two arcs joined by said flexible member;
   wherein said at least one flexible member is capable of expanding to reduce deflection stresses when the circumference of said band increases.

2. The pole crossover of claim 1, wherein one flexible member is present when said band is semi-circular and two flexible members are present when said band is circular.

3. The pole crossover of claim 1, wherein said flexible member divides said band into approximately equal arcs.

4. The pole crossover of claim 1, wherein said pole crossover is manufactured as a contiguous unit.

5. The pole crossover of claim 1, wherein said flexible member is an omega shaped bow.

6. The pole crossover of claim 5, wherein said omega shaped bow comprises a plurality of stacked thin sheet laminations.

7. The pole crossover of claim 6, wherein said plurality of stacked thin sheet laminations are composed essentially of copper.

8. The pole crossover of claim 5, wherein said omega shaped bow is joined to said band via struts that are raised on the inner circumference of said band.

9. The pole crossover of claim 1, wherein said flexible member is recessed in relation to the outer circumference of said band.

10. A pole crossover with a deflection stress reducing section comprising:

a band;

two struts; and an omega shaped bow with an integral loop;

wherein said omega shaped bow intersects said band, dividing said band into separate arcs;

wherein said omega shaped bow is joined to said band via said two struts, and wherein said struts are raised on the inner circumference of said band such that said omega shaped bow is oriented such that said integral loop is oriented outwardly and said omega shaped bow is recessed in respect to the outer circumference of said band;

wherein said omega shaped bow is comprised of a plurality of stacked thin sheet laminations;

wherein said omega shaped bow reduces deflection stresses created by the expansion of said band.

11. The pole crossover of claims 10, wherein said plurality of stacked thin sheet laminations comprise 2–16 thin sheets.

12. The pole crossover of claims 11, wherein said plurality of stacked thin sheet laminations comprise 8–12 thin sheets.

13. The pole crossover of claims 10, wherein said thin sheets are approximately 0.016–0.125 inches (0.041–0.318 cm) in thickness.

14. The pole crossover of claims 10, wherein said omega shaped bow is approximately 0.016–0.125 inches (0.041–0.318 cm) thick, 1.5–2.5 inches (3.8–6.3 cm) wide and 3.5–5.0 inches (8.8–12.5 cm) long.

15. The pole crossover of claims 10, wherein said omega shaped bow intersects said band at approximately the band's midway point.

16. The pole crossover of claims 10, wherein a plurality of said omega shaped bows intersect said band.

17. An apparatus for allowing an expansion area within a pole crossover band comprising:

an omega shaped bow, wherein said omega shaped bow divides said pole crossover band into separate arcs; and two struts on said separate arcs that are raised on the inner circumference of said separate arcs;

wherein said omega shaped bow joins said separate arcs via said two struts and wherein said omega shaped bow is oriented such that the integral loop of the omega shaped bow is oriented outwardly with respect to said pole crossover band and wherein said omega shaped bow is recessed with respect to the outer circumference of said pole crossover band;

wherein said omega shaped bow allows for expansion of said pole crossover band without the creation of deflection related stresses;

wherein said omega shaped bow is made of a plurality of stacked thin sheet laminations.

18. The apparatus of claim 17, wherein said omega shaped bow is recessed approximately 0.1–0.2 inches (0.25–0.5 cm).

19. The apparatus of claim 17, wherein said plurality of stacked thin sheet laminated are copper.

* * * * *